(12) United States Patent
Cislo et al.

(10) Patent No.: US 12,534,898 B2
(45) Date of Patent: Jan. 27, 2026

(54) MULTI-FIT INLINE SURFACE DRAIN

(71) Applicant: Advanced Drainage Systems, Inc., Hilliard, OH (US)

(72) Inventors: Joshua James Cislo, Findlay, OH (US); Ronald R. Vitarelli, Marlborough, CT (US); Jeremy Daniel Cadeau, Cumming, GA (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 18/625,447

(22) Filed: Apr. 3, 2024

(65) Prior Publication Data

US 2024/0247476 A1    Jul. 25, 2024

Related U.S. Application Data

(63) Continuation of application No. 17/330,755, filed on May 26, 2021, now Pat. No. 11,976,456.

(60) Provisional application No. 63/031,206, filed on May 28, 2020.

(51) Int. Cl.
E03F 5/04 (2006.01)
F16L 21/00 (2006.01)
F16L 39/00 (2006.01)

(52) U.S. Cl.
CPC ............ E03F 5/041 (2013.01); F16L 21/002 (2013.01); F16L 39/005 (2013.01)

(58) Field of Classification Search
CPC ..... E03F 5/041; E03F 1/00; E03F 5/04; F16L 21/002; F16L 39/005
See application file for complete search history.

(56) References Cited

U.S. PATENT DOCUMENTS

| | | | | |
|---|---|---|---|---|
| 1,109,740 A | * | 9/1914 | Dehn | E03F 5/04 137/247.23 |
| 2,394,964 A | * | 2/1946 | Dick | E03C 1/26 210/165 |
| 3,866,950 A | | 2/1975 | Skoch et al. | |
| D402,013 S | * | 12/1998 | Saffrey | D23/263 |

(Continued)

FOREIGN PATENT DOCUMENTS

| CA | 2852720 A1 | 10/2015 |
|---|---|---|
| DE | 4119127 A1 * | 12/1991 |

(Continued)

OTHER PUBLICATIONS

Translation of the Description Portion of DE4119127A1, Retreivd from the EPO on Jan. 24, 2025.*

(Continued)

*Primary Examiner* — Matthew Troutman
*Assistant Examiner* — James A Linford
(74) *Attorney, Agent, or Firm* — FINNEGAN, HENDERSON, FARABOW, GARRETT & DUNNER L.L.P.

(57) ABSTRACT

An in-line surface drain may comprise a cylindrical frame and a plurality of concentric rings coupled to the cylindrical frame. The plurality of concentric rings may be configured to protrude outward from a bottom external surface of the cylindrical frame, and the diameters of the plurality of concentric rings may be different. At least one of the plurality of concentric rings may be configured to detachably accommodate a riser pipe.

18 Claims, 13 Drawing Sheets

(56) References Cited

U.S. PATENT DOCUMENTS

| | | | |
|---|---|---|---|
| 7,108,783 B2 | 9/2006 | Glazik | |
| 7,303,357 B2 * | 12/2007 | Villarreal | E03F 5/0401 405/36 |
| 7,350,824 B2 | 4/2008 | Petner et al. | |
| 8,168,064 B2 | 5/2012 | Peters, Jr. et al. | |
| 8,438,731 B2 | 5/2013 | Peters, Jr. et al. | |
| D732,146 S * | 6/2015 | Nattrass | D23/261 |
| 2005/0103694 A1 | 5/2005 | Rost et al. | |
| 2008/0083676 A1 * | 4/2008 | DePaul | B01D 1/0017 210/180 |
| 2012/0018362 A1 | 1/2012 | Swanston | |
| 2016/0090727 A1 | 3/2016 | Elliott | |

FOREIGN PATENT DOCUMENTS

| | | |
|---|---|---|
| EP | 0457011 A1 | 11/1991 |
| EP | 1362961 A1 | 11/2003 |
| EP | 2886730 A1 | 6/2015 |
| FR | 1529813 A | 6/1968 |
| JP | H0671564 U | 10/1994 |
| KR | 20-0395202 | 9/2005 |
| KR | 10-2007-0052722 A | 5/2007 |

OTHER PUBLICATIONS

International Search Report and Written Opinion in International Application No. PCT/US2021/034205, dated Aug. 17, 2021 (29 pages).
KR 10-2007-0052722 A English Translation (2007)—retrieved from Questel Machine translations on Oct. 19, 2023.
EP 1362961 A1 English Translation (2003)—retrieved from Questel Machine translations on Oct. 19, 2023.
EP 0457011 A1 English Translation (1991)—retrieved from Questel Machine translations on Oct. 19, 2023.

* cited by examiner

MULTI-FIT INLINE SURFACE DRAIN

CROSS REFERENCE TO RELATED APPLICATION

This application is a continuation of application Ser. No. 17/330,755 filed May 26, 2021 which, claims the benefit of U.S. Provisional Application No. 63/031,206, filed May 28, 2020, entitled "Multi-Fit Inline Surface Drain," both of which are hereby incorporated by reference in their entireties.

TECHNICAL FIELD

This disclosure relates generally to inline surface drains, and more particularly, to inline surface drains for stormwater management systems that can be used to terminate a riser pipe at the surface.

BACKGROUND

Stormwater inlets and piping systems are used to capture and convey stormwater for a wide variety of applications. Surface capture of stormwater into an underground conveyance, storage, or treatment system is common. Such systems typically comprise underground pipes that must be brought to the surface by, for example, vertically extending riser pipes. Riser pipes vertically feed the surface drainage into underground stormwater pipes. In order to make sure that the riser pipes terminate at the surface, inline surface drains are used.

Conventional inline surface drains, however, are made through a custom fabrication process and are made to fit a specific riser pipe. Because conventional inline surface drains are cast to adapt to specific sizes of riser pipes, a single inline surface drain is not capable of fitting more than one size of a riser pipe.

Therefore, there is a need for an improved inline surface drain that is capable of fitting multiple diameters of riser pipes. There is also a need for an improved inline surface drain that can securely fasten onto the riser pipe to prevent the surface drain from dislodging during installation.

SUMMARY

Embodiments of the present disclosure may include an in-line surface drain, comprising a cylindrical frame and a plurality of concentric rings coupled to the cylindrical frame. The plurality of concentric rings may be configured to protrude outward from a bottom external surface of the cylindrical frame, and the diameters of the plurality of concentric rings may be different. Additionally, at least one of the plurality of concentric rings may be configured to detachably accommodate a riser pipe.

In some embodiments, the in-line surface drain may comprise a plurality of flanges disposed on an external surface of the cylindrical frame. In some embodiments, the in-line surface drain may comprise a lip section formed on an external surface of the cylindrical frame. In other embodiments, the plurality of concentric rings may be cut from the cylindrical frame. Additionally, or alternatively, the heights of the plurality of concentric rings may be different. In some embodiments, the heights of the plurality of concentric rings may be the same.

In some embodiments, the at least one of the plurality of concentric rings may comprise an internal surface of a first diameter and an external surface of a second diameter, and the riser pipe may be configured to detachably couple to the internal surface of the at least one of the plurality of concentric rings. In other embodiments, the at least one of the plurality of concentric rings may comprise an internal surface of a first diameter and an external surface of a second diameter, and the riser pipe may be configured to detachably couple to the external surface of the at least one of the plurality of concentric rings. In some embodiments, the at least one of the plurality of concentric rings may comprise a stepped internal surface or a stepped external surface. The stepped internal surface or the stepped external surface may be configured to accommodate riser pipes of different diameters. In some embodiments, at least one of the plurality of concentric rings may comprise both a stepped internal surface and a stepped external surface.

According to another embodiment of the present disclosure, an in-line surface drain comprising a cylindrical frame and a plurality of concentric rings coupled to the cylindrical frame is provided. Each of the plurality of concentric rings may comprise an internal surface of a first diameter and an external surface of a second diameter. The plurality of concentric rings may be configured to protrude outward from a bottom external surface of the cylindrical frame, and diameters of the plurality of concentric rings may be different. Additionally, at least one of the plurality of concentric rings may be configured to accommodate a plurality of riser pipes of different diameters.

In some embodiments, the in-line surface drain may comprise a plurality of flanges disposed on an external surface of the cylindrical frame. In some embodiments, the in-line surface drain may comprise a lip section formed on an external surface of the cylindrical frame. In other embodiments, the plurality of concentric rings may be cut from the cylindrical frame. Additionally, or alternatively, the heights of the plurality of concentric rings may be different. In some embodiments, the heights of the plurality of concentric rings may be the same.

In some embodiments, the at least one of the plurality of concentric rings may comprise a stepped internal surface or a stepped external surface. The stepped internal surface or the stepped external surface may be configured to accommodate riser pipes of different diameters. In some embodiments, a bottom internal surface of the cylindrical frame may comprise a stepped surface.

BRIEF DESCRIPTION OF THE DRAWINGS

The accompanying drawings, which are incorporated into and constitute a part of this specification, illustrate disclosed embodiments and, together with the description, serve to explain the disclosed embodiments.

DETAILED DESCRIPTION

Reference will now be made in detail to the present embodiments (exemplary embodiments) of the disclosure, examples of which are illustrated in the accompanying drawings.

As discussed in further detail below, various embodiments of an in-line surface drain for stormwater drainage systems are provided. The in-line surface drain, consistent with the embodiments of the present disclosure, may be able to fit multiple diameter riser pipes and may securely fasten to a riser pipe to prevent the surface drain from dislodging during installation. In some embodiments, the in-line surface drain may comprise a concentric ring system, such as a plurality of concentric rings, that can be trimmed or knocked-out with a hammer or other known methods to an appropriate size for installation. The length of the concentric rings may also be designed such that the smallest ring may be the longest, and thus, knocked out first.

The in-line surface drain, consistent with the embodiments of the present disclosure, may also comprise a locking feature accomplished by, for example, forming one or more slots in the concentric rings to allow for fastening hardware to pass through the drain product and through the riser pipe. As such, the in-line surface drain may be secured to the riser pipe. The one or more slots may also allow for adjustability in the installation and less-infield modifications by the end user. Additionally, the in-line surface drain is not limited to vertical orientations. For example, the in-line surface drain may be coupled to a riser pipe vertically such that the riser pipe can be terminated at a surface. Additionally, or alternatively, the in-line surface drain may be oriented horizontally and coupled to a riser pipe horizontally so as to connect horizontally to other pipes and/or structures.

While the embodiments of the present disclosure provide examples of in-line surface drains that are configured to be coupled to riser pipes of various diameters, it should be noted that aspects of the disclosure, in their broadest sense, are not limited to in-line surface drains. Rather, it is contemplated that the foregoing principles may be applied to other devices, systems, and methods for connecting riser pipes in stormwater drainage systems. In addition, the term "in-line surface drain" refers generally to any element that is capable of connecting one or more riser pipes in stormwater draining systems. For example, an in-line surface drain may be any multi-fit connection system that is capable of being coupled to riser pipes of various diameters.

Figure 1:
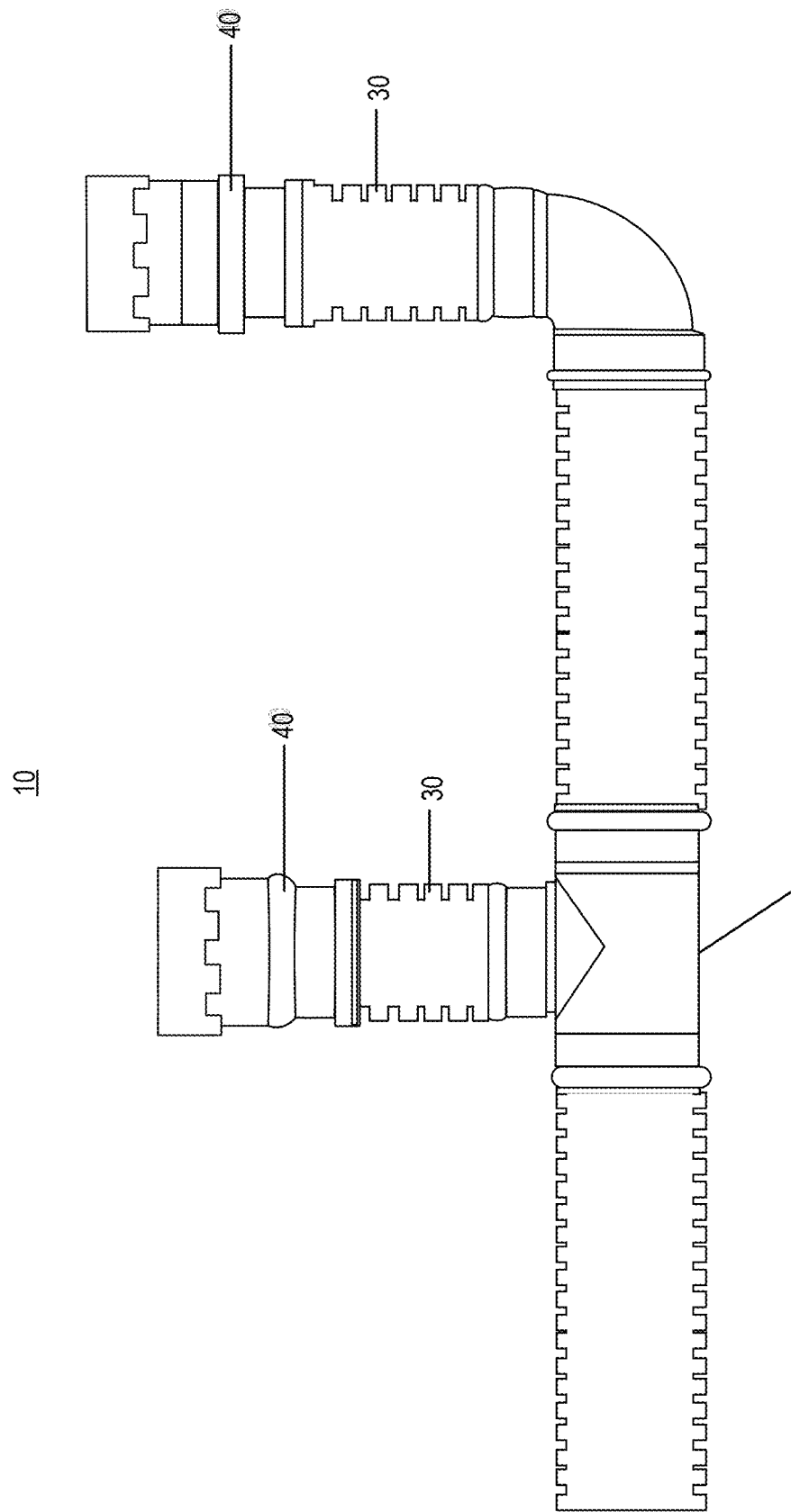
FIG. 1 is an illustration of an exemplary stormwater drainage system, consistent with the embodiments of the present disclosure.

Turning now to the drawings, FIG. 1 illustrates an exemplary embodiment of a stormwater drainage system 10 according to an embodiment of the present disclosure. In the illustrated embodiment, stormwater drainage system 10 may comprise a tee 20, a riser pipe 30, and an in-line surface drain 40. As illustrated in FIG. 1, one end of riser pipe 30 may be detachably coupled to tee 20, and another end of riser pipe 30 may be detachably coupled to in-line surface drain 40. Accordingly, surface drainage, may flow down surface drain 40, through riser pipe 30, through tee 20, and through various underground pipes to be deposited in the ground or an off-site location. As shown in FIG. 1, in-line surface drain 40 may be coupled to riser pipe 30 such that the vertically extending riser pipe 30 can be terminated at the surface.

Figure 2:
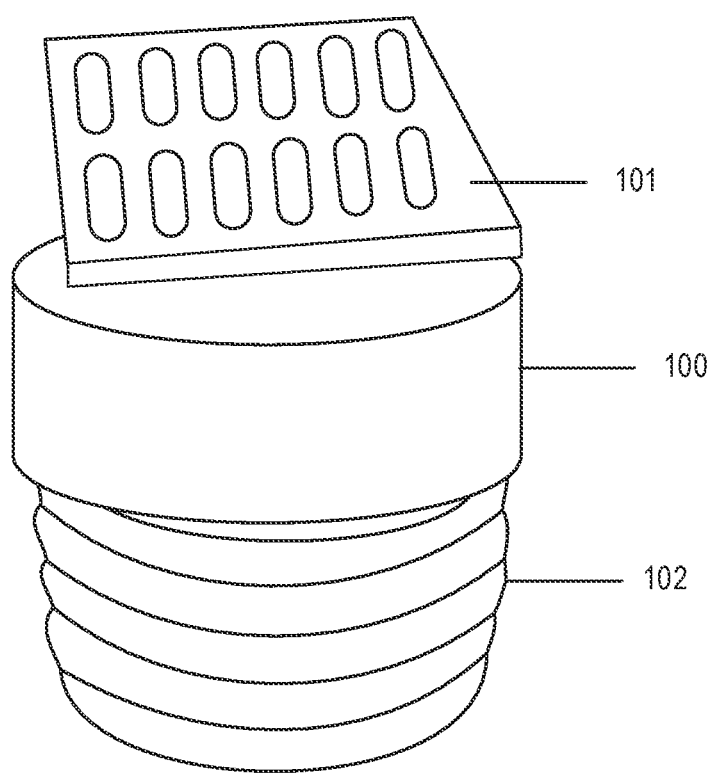
FIG. 2 is an illustration of an exemplary in-line surface drain, consistent with the embodiments of the present disclosure.

FIG. 2 illustrates an exemplary in-line surface drain 100 coupled to an exemplary riser pipe 102 and configured to terminate riser pipe 102 at the surface of the ground. In-line surface drain 100 may also be configured to be coupled to a surface casting 101. Surface casting 101 may comprise a solid cover or a perforated cover with a plurality of openings. Conventionally, in-line surface drains are made through a custom fabrication process and are made to fit a specific diameter of a riser pipe. Accordingly, conventional in-line surface drains are only capable of adapting to a specific diameter of riser pipe but are not capable of fitting riser pipes of other diameters. Therefore, there is a need for an improved in-line surface drain that is capable of fitting multiple sizes and diameters of riser pipes.

Figure 3A:
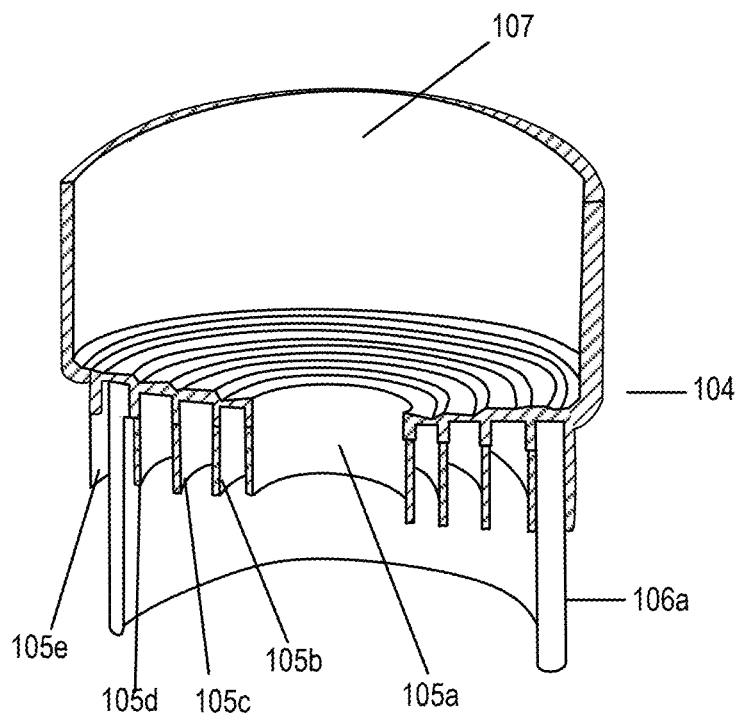
FIG. 3A is an illustration of an exemplary in-line surface drain coupled to an exemplary riser pipe, consistent with the embodiments of the present disclosure.
Figure 3B:
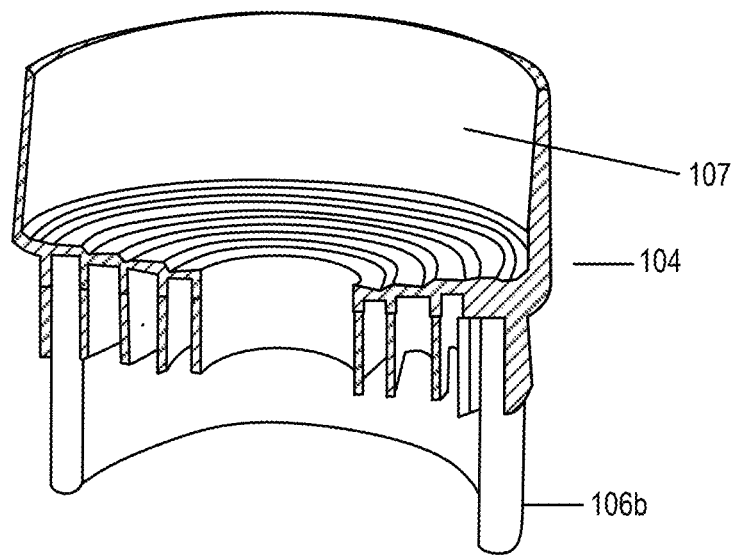
FIG. 3B is an illustration of an exemplary in-line surface drain coupled to an exemplary riser pipe, consistent with the embodiments of the present disclosure.
Figure 3C:
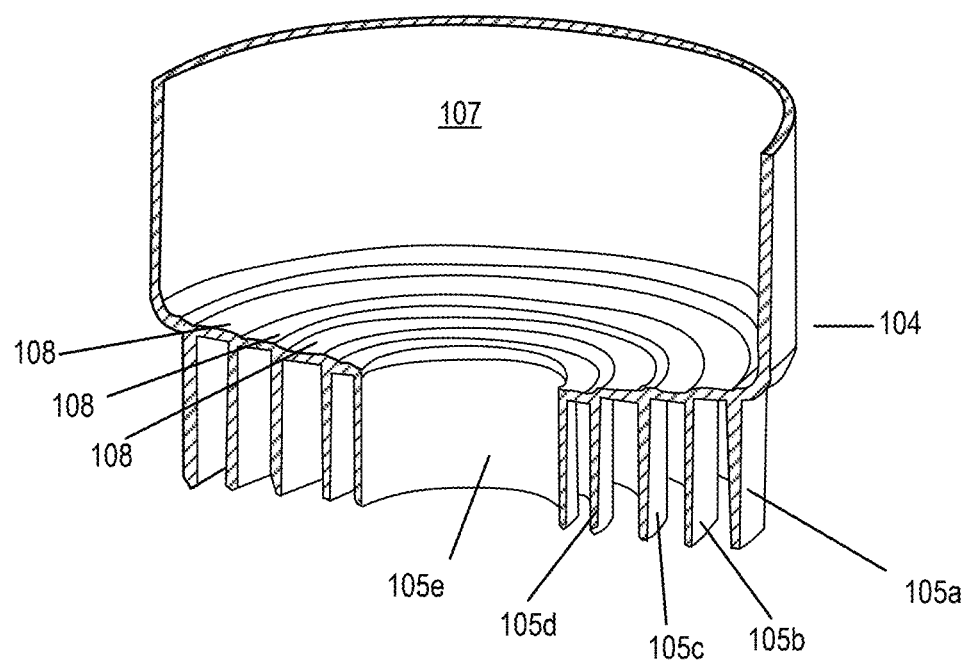
FIG. 3C is another illustration of the exemplary in-line surface drain of FIG. 3A, consistent with the embodiments of the present disclosure.

Turning now to FIGS. 3A, 3B and 3C, an exemplary in-line surface drain 104, in accordance with an embodiment of the present disclosure, is provided. As illustrated in FIGS. 3A, 3B and 3C, in-line surface drain 104 may comprise a cylindrical frame 107 and a plurality of concentric rings 105a-e extending or protruding outward from a bottom external surface of cylindrical frame 107. Cylindrical frame 107 may have a diameter in a range between about 4 inches and about 36 inches. For example, cylindrical frame 107 may have a diameter between about 12 inches and 20 inches. In some embodiments, cylindrical frame 107 may have a height in a range between about 3 inches and 10 inches. For example, cylindrical frame 107 may have a height of about 7 inches.

Cylindrical frame 107 of in-line surface drain 104 may be coupled to a plurality of concentric rings 105a-e. In some embodiments, the plurality of concentric rings 105a-e may be cut from cylindrical frame 107. In other embodiments, the plurality of concentric rings 105a-e may be detachably coupled to cylindrical frame 107. While FIGS. 3A, 3B and 3C illustrates in-line surface drain 104 comprising five concentric rings 105a-e, in other embodiments, in-line surface drain 104 may comprise two, three, four, six, seven, eight, nine, or ten concentric rings. Additionally, or alternatively, one or more heights of the concentric rings 105a-e may be the same. In some embodiments, all of the concentric rings 105a-e may have the same height. The plurality of concentric rings 105a-e may comprise different diameters and may be configured to be detachably coupled to riser pipes of different sizes and diameters. In other embodiments, at least one of the plurality of concentric rings 105a-e may seal to the riser pipe by a connection. The connection may comprise, for example, a gasketed connection, an elastomeric seal, a glue connection, a primer connection, or a solvent welded connection. For example, concentric ring 105a may have a smaller diameter than concentric ring 105b, concentric ring 105b may have a smaller diameter than concentric ring 105c, concentric ring 105c may have a smaller diameter than concentric ring 105d, and concentric ring 105d may have a smaller diameter than concentric ring 105e. The plurality of concentric rings 105a-e may have diameters in a range between about 4 inches to about 36 inches. For example, concentric rings 105a-e may have diameters of about 4 inches, 6 inches, 8 inches, 10 inches, 12 inches, 14 inches, 15 inches, 16 inches, 18 inches, 21 inches, 24 inches, or 36 inches. Accordingly, in-line surface drain 104 may be coupled to a riser pipe 106a and/or a riser pipe 106b. Riser pipe 106a and riser pipe 106b may have different diameters. In some embodiments, riser pipe 106a and riser pipe 106b may have diameters in a range between about 4 inches to about 36 inches. For example, riser pipe 106a and riser pipe 106b may have diameters of about 4 inches, 6 inches, 8 inches, 10 inches, 12 inches, 14 inches, 15 inches, 16 inches, 18 inches, 20 inches, 21 inches, 24 inches, or 36 inches.

In some embodiments, in-line surface drain 104 may be formed using various casting and/or molding techniques. For example, in-line surface drain 104 may be formed by resin casting, injection molding, extrusion molding, or other plastic casting and/or molding processes. Cylindrical frame 107 and concentric rings 105a-e of in-line surface drain 104 may be formed using materials, such as plastic. For example, cylindrical frame 107 and concentric rings 105a-e may be formed using polyvinyl chloride (PVC), corrugated polyethylene, or corrugated polypropylene. In some embodiments, cylindrical frame 107 and concentric rings 105a-e may be formed using fiberglass or thermoplastic polymer, such as acrylonitrile butadiene styrene (ABS). In some embodiments, cylindrical frame 107 and concentric rings 105a-e may be manufactured using the same material. In other embodiments, cylindrical frame 107 and concentric rings 105a-e may be manufactured using different materials.

As shown in FIG. 3C, in some embodiments, cylindrical frame 107 may comprise a stepped surface. For example, cylindrical frame 107 may comprise a bottom internal surface that is stepped. In some embodiments, each step 108 on the bottom internal surface of cylindrical frame 107 may correspond to a respective concentric ring of the plurality of concentric rings 105a-e. Accordingly, the width of each step 108 may extend the width of each corresponding concentric ring 105a-e. In some embodiments, steps 108 may be positioned lower in height as steps 108 become closer to a center of cylindrical frame 107. The plurality of steps 108 may allow the plurality of concentric rings 105a-e to be easily trimmed or knocked-out with a hammer or other known methods to an appropriate size for installation onto a riser pipe.

FIGS. 4A-4D illustrate multiple views of an exemplary in-line surface drain 104', consistent with the embodiments of the present disclosure. As seen in FIGS. 4A-4D, in-line surface drain 104' may comprise a cylindrical frame 107' and a plurality of concentric rings 105a'-e' of different diameters. In some embodiments, as discussed above, the bottom internal surface of cylindrical frame 107' may not be flat, but rather may be stepped. For example, the bottom internal surface of cylindrical frame 107' may comprise a plurality of steps 108. The width of each step 108 may extend the width of each corresponding concentric ring 105a'-e'. In some embodiments, steps 108 may be positioned lower in height as steps 108 become closer to a center of cylindrical frame 107'. The plurality of steps 108 may allow the plurality of concentric rings 105a'-e' to be easily trimmed or knocked-out with a hammer or other known methods to an appropriate size for installation onto a riser pipe.

In some embodiments, the bottom internal surface of cylindrical frame 107' may be slanted downwards at an angle from the outer perimeter to the center of the cylindrical frame 107'. Accordingly, the height of the cylindrical frame 107' may be the smallest at the exterior surface and may increase towards the center of the cylindrical frame 107'. The slanted bottom surface of cylindrical frame 107' may further allow the plurality of concentric rings 105a'-e' to be easily trimmed or knocked-out with a hammer or other known methods to an appropriate size for installation onto a riser pipe.

Figure 4A:
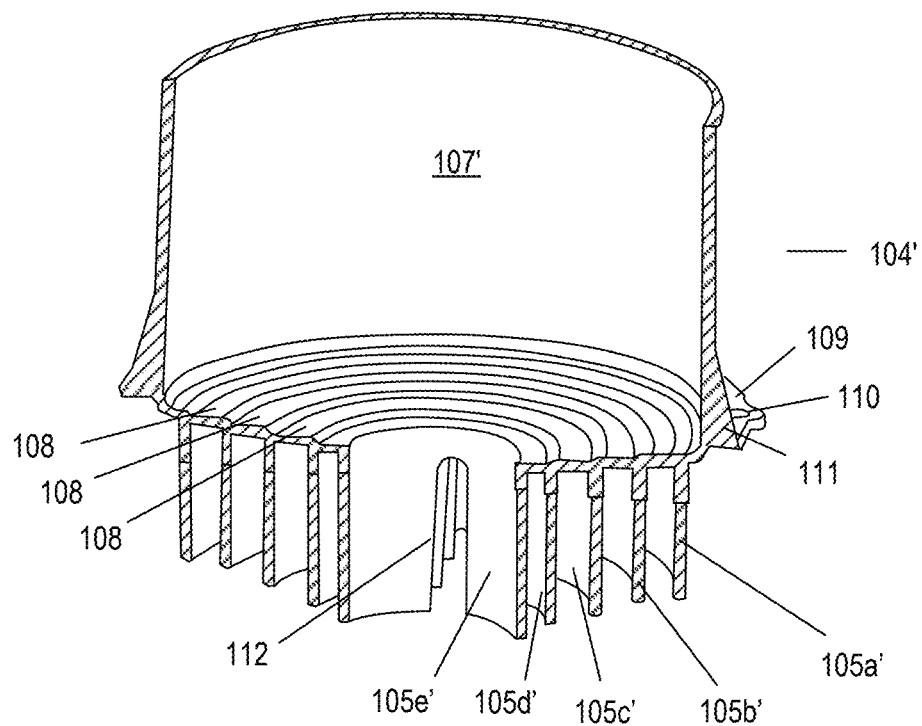
FIG. 4A is an illustration of another exemplary in-line surface drain, consistent with the embodiments of the present disclosure.
Figure 4B:
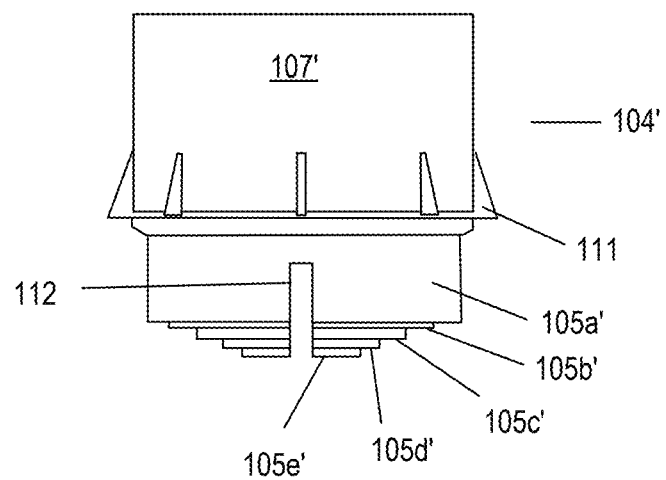
FIG. 4B is an elevation view of the exemplary in-line surface drain of FIG. 4A, consistent with the embodiments of the present disclosure.

Additionally, or alternatively, the height of each of the plurality of concentric rings 105a'-e' may be different. For example, as seen in FIGS. 4A and 4B, the height of concentric ring 105e' may be greater than the height of concentric ring 105d', the height of concentric ring 105d' may be greater than the height of concentric ring 105c', the height of concentric ring 105c' may be greater than the height of concentric ring 105b', and the height of concentric ring 105b' may be greater than the height of concentric ring 105a'. Accordingly, as opposed to the plurality of concentric rings 105a-e in FIGS. 3A, 3B and 3C that have the same heights, the plurality of concentric rings 105a'-e' in FIGS. 4A and 4B may have different heights. The differing heights of concentric rings 105a'-e' may allow one or more of the concentric rings 105a'-e' to be knocked-out with a hammer or other known method to an appropriate diameter for installation onto a riser pipe of a specific size. For example, the different heights may allow concentric ring 105e' to be knocked out first, leaving other concentric rings 105a'-d' intact. After knocking out concentric ring 105e', the differing heights may further allow concentric ring 105d' to be knocked out second, leaving other concentric rings 105a'-c' intact, and so on. Additionally, or alternatively, one or more heights of the plurality of concentric rings 105a'-e' may be different. For example, the height of concentric ring 105e' may be greater than the height of concentric ring 105d', and the height of concentric ring 105d' may be greater than the height of concentric ring 105c', but the heights of concentric rings 105c'-105a' may be the same. Accordingly, in some embodiments, one or more heights of concentric rings 105a'-e' may be the same, and one or more heights of concentric rings 105a'-e' may be different.

Figure 4D:
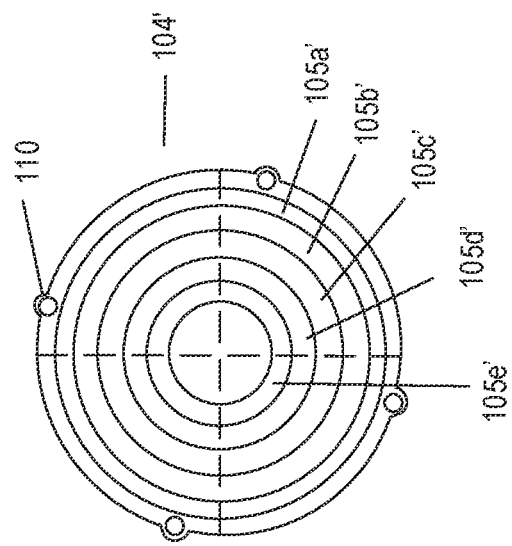
FIG. 4D is a plan view of the exemplary in-line surface drain of FIG. 4A, consistent with the embodiments of the present disclosure.
Figure 4C:
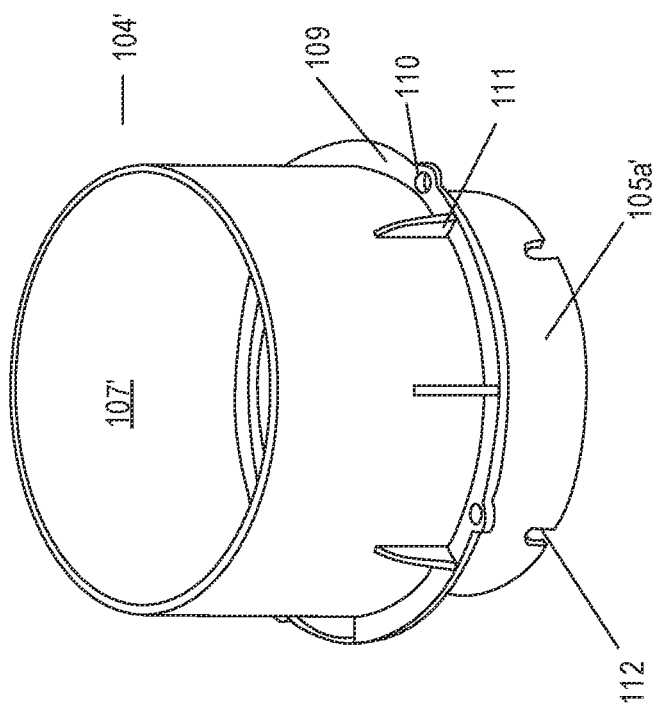
FIG. 4C is a perspective view of the exemplary in-line surface drain of FIG. 4A, consistent with the embodiments of the present disclosure.

In some embodiments, cylindrical frame 107' of in-line surface drain 104' may comprise a lip section 109 extending outward from an external surface of cylindrical frame 107'. Lip section 109 may comprise at least one anchor point 110 and at least one flange 111. Anchor point 110 may comprise a hole formed in lip section 109. In some embodiments, anchor point 110 and flange 111 may serve as an anchoring system for in-line surface drain 104'. For example, a rebar (not shown) or other known anchoring mechanisms (not shown) may be coupled to the at least one anchor point 110 in order to anchor in-line surface drain 104', such as into soil. Accordingly, the at least one anchor point 110 and flange 111 may prevent movement of in-line surface drain 104' during installation and/or after installation. In some embodiments, and as illustrated in FIGS. 4C and 4D, cylindrical frame 107' of in-line surface drain 104' may comprise a plurality of anchor points 110 and a plurality of flanges 111 formed circumferentially around an external surface of cylindrical frame 107'. The plurality of flanges 111 may be circumferentially spaced apart from each other around cylindrical frame 107'. For example, flanges 111 may be circumferentially spaced equidistant from each other around cylindrical frame 107'. In some embodiments, in-line surface drain 104' may comprise between about two and twenty flanges 111 spaced apart from each other. For example, in-line surface drain 104' may comprise about ten flanges 111 spaced apart from each other around cylindrical frame 107'.

Additionally, or alternatively, in-line surface drain 104' may comprise at least one slot 112 formed through the plurality of concentric rings 105a'-e'. In some embodiments, in-line surface drain 104' may comprise a plurality of slots 112. The width of slot 112 may be between about 0.2 inches to about 1.5 inches. For example, slot 112 may have a width of about 1 inch. In some embodiments, and as seen in FIG. 4C, slot 112 may be tapered at an angle. As such, the width at the top of slot 112 may be smaller than the width at the bottom of slot 112. In other embodiments, slot 112 may not be tapered at an angle such that the width of slot 112 remains constant along its length. In some embodiments, the length of slot 112 may be between about 1 inch to about 5 inches. For example, the length of slot 112 may be about 3.5 inches. Slot 112 may be configured to cooperate with a locking feature, such as a bolt, to secure a riser pipe coupled to the concentric rings 105a'-e' of in-line surface drain 104'. For example, a bolt (not shown) or other securing mechanism (not shown) may be pushed through slot 112 to secure the concentric rings 105a'-e' of in-line surface drain 104' to a riser pipe. In some embodiments, in-line surface drain 104' may comprise more than one slot 112. For example, in-line surface drain 104' may comprise between two and ten slots 112 circumferentially spaced apart from each other. The plurality of slots 112 may be formed through the plurality of concentric rings 105a'-e' and may be circumferentially spaced apart from each other. For example, in-line surface drain 104' may comprise between two and ten slots 112 circumferentially spaced equidistant from each other around the plurality of concentric rings 105a'-e'.

In addition, as seen in FIG. 4D, in-line surface drain 104' may comprise a plurality of anchor points 110 formed in lip section 109. In some embodiments, in-line surface drain 104' may comprise between about two and ten anchor points 110 formed in lip section 109. For example, as illustrated in FIG. 4D, in-line surface drain 104' may comprise about four anchor points 110 formed in lip section 109. The plurality of anchor points 110 may be circumferentially spaced equidistant from each other around lip section 110. For example, in FIG. 4D, each of the four anchor points 110 may be spaced 90° apart from each other. In some embodiments, anchor points 110 may comprise holes formed in lip section 109. Anchor points 110 may comprise holes having diameters between about 0.2 inches and about 1 inch. For example, anchor points 110 may have diameters of about 0.5 inches. The diameter of anchor points 110 may depend on the size of a rebar or other anchoring mechanism that is to be coupled to the anchor points 110 to anchor in-line surface drain 104'.

Figure 5:
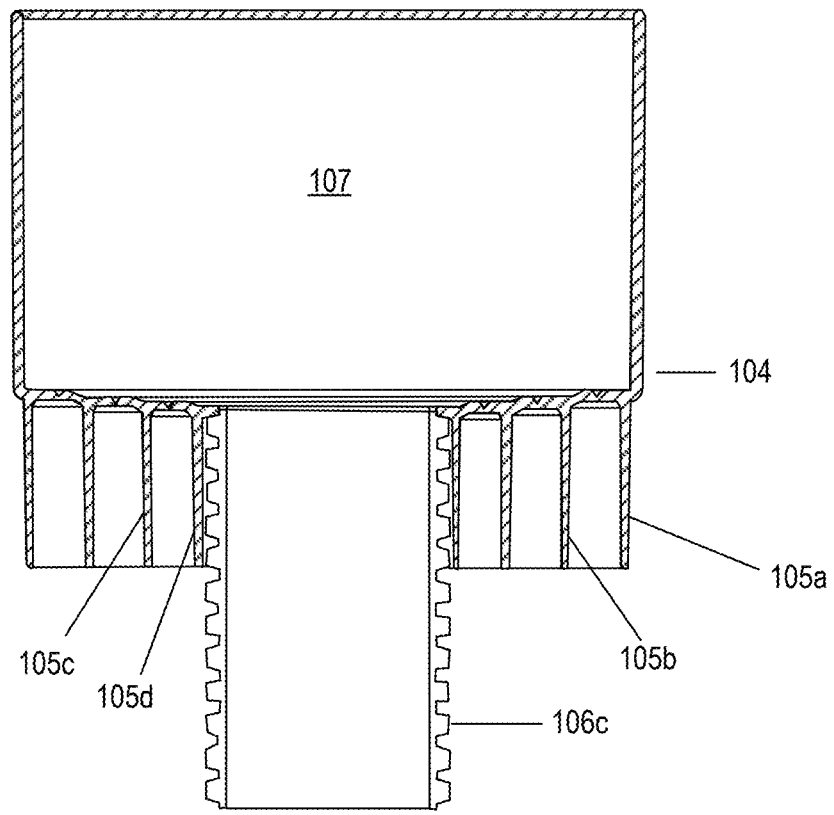
FIG. 5 is an illustration of another exemplary in-line surface drain, consistent with the embodiments of the present disclosure.

FIG. 5 illustrates an exemplary in-line surface drain 104, consistent with the embodiments of the present disclosure. As shown in FIG. 5, in-line surface drain 104 may comprise a cylindrical frame 107 and a plurality of concentric rings 105a-e extending or protruding outward from a bottom external surface of cylindrical frame 107. Cylindrical frame 107 may have a diameter in a range between about 4 inches and about 36 inches. For example, cylindrical frame 107 may have a diameter between about 12 inches and 20 inches. In some embodiments, cylindrical frame 107 may have a height in a range between about 3 inches and 10 inches. For example, cylindrical frame 107 may have a height of about 7 inches.

In some embodiments, the plurality of concentric rings 105a-e may comprise different diameters and may be configured to be detachably coupled to riser pipes of different sizes and diameters. For example, concentric ring 105a may have a smaller diameter than concentric ring 105b, concentric ring 105b may have a smaller diameter than concentric ring 105c, and concentric ring 105c may have a smaller diameter than concentric ring 105d. The plurality of concentric rings 105a-e may have diameters in a range between about 4 inches to about 36 inches. For example, concentric rings 105a-e may have diameters of about 4 inches, 6 inches, 8 inches, 10 inches, 12 inches, 14 inches, 15 inches, 16 inches, 18 inches, 21 inches, 24 inches, or 36 inches.

As illustrated in FIG. 5, for example, concentric ring 105d of the plurality of concentric rings 105a-e may be configured to detachably accommodate a riser pipe 106c. Riser pipe 106c may comprise, for example, a corrugated high-density polyethylene (HDPE) pipe. Riser pipe 106c, however, is not limited to a corrugated HDPE pipe and may comprise, for example, polyvinyl chloride (PVC), corrugated polyethylene, corrugated polypropylene, fiberglass, or thermoplastic polymer. In other embodiments, riser pipe 106c may comprise a smooth external surface instead of a corrugated external surface. As shown in FIG. 5, concentric ring 105d may comprise an internal surface with an internal diameter that corresponds with an external diameter of riser pipe 106c such that riser pipe 106c can be accommodated within concentric ring 105d. For example, riser pipe 106c may have an external diameter of about 4 inches, 6 inches, 8 inches, 10 inches, 12 inches, 14 inches, 15 inches, 16 inches, 18 inches, 20 inches, 21 inches, 24 inches, or 36 inches.

Figure 6A:
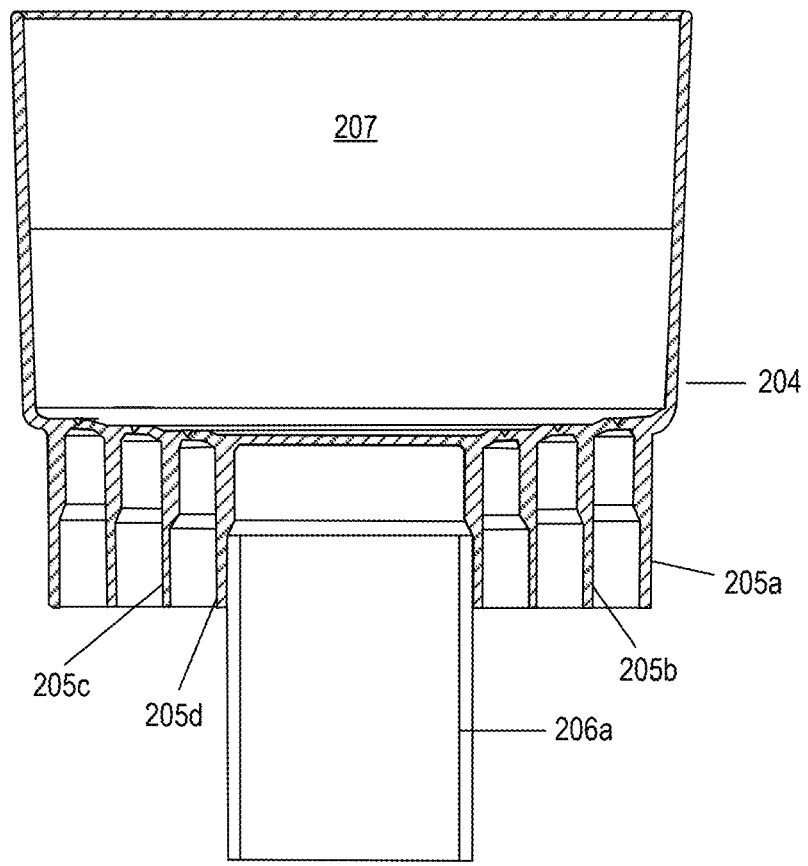
FIG. 6A is an illustration of another exemplary in-line surface drain, consistent with the embodiments of the present disclosure.
Figure 6B:
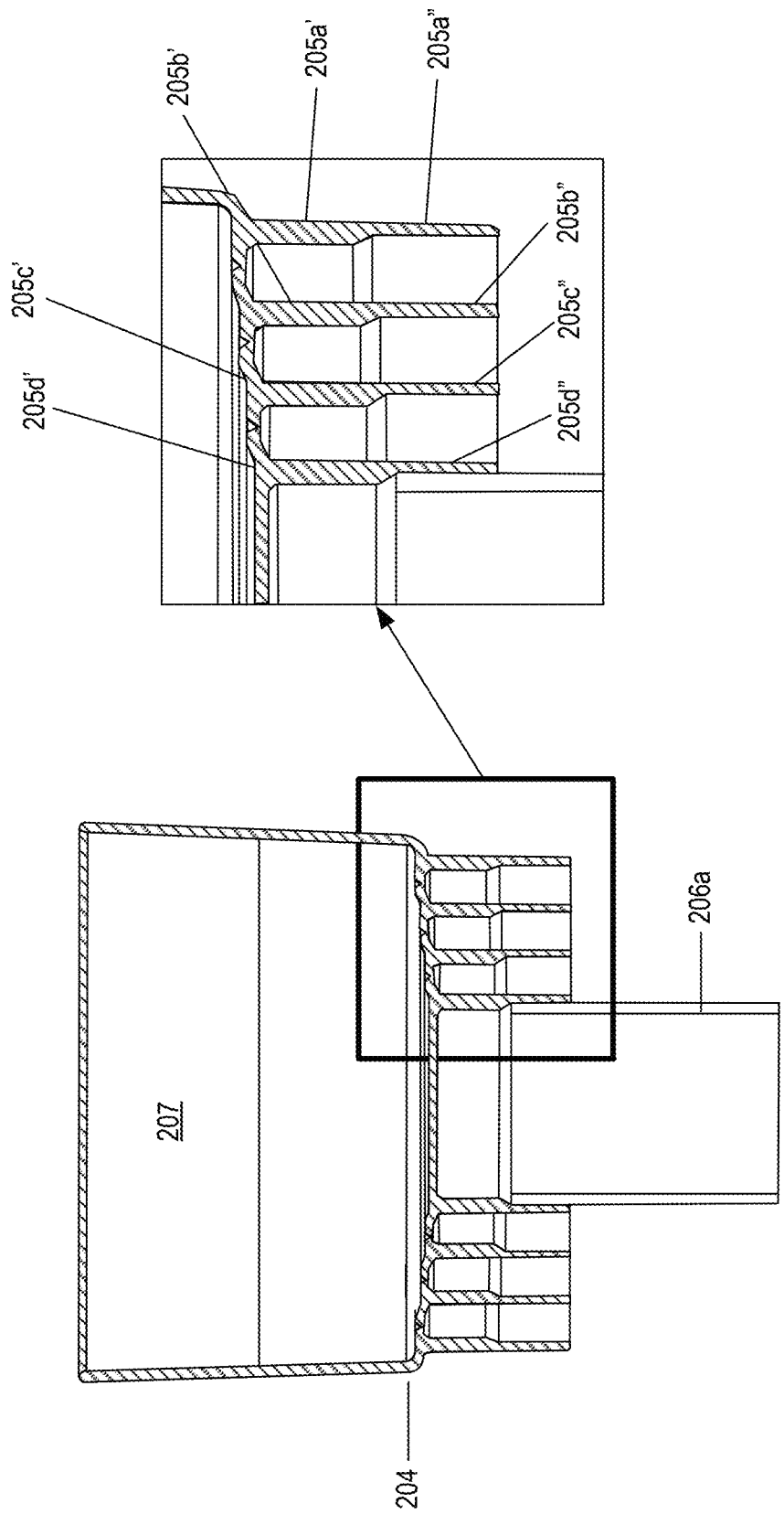
FIG. 6B is another illustration of the exemplary in-line surface drain of FIG. 6A and provides a blown-up depiction of a portion of the exemplary drain, consistent with the embodiments of the present disclosure.
Figure 6C:
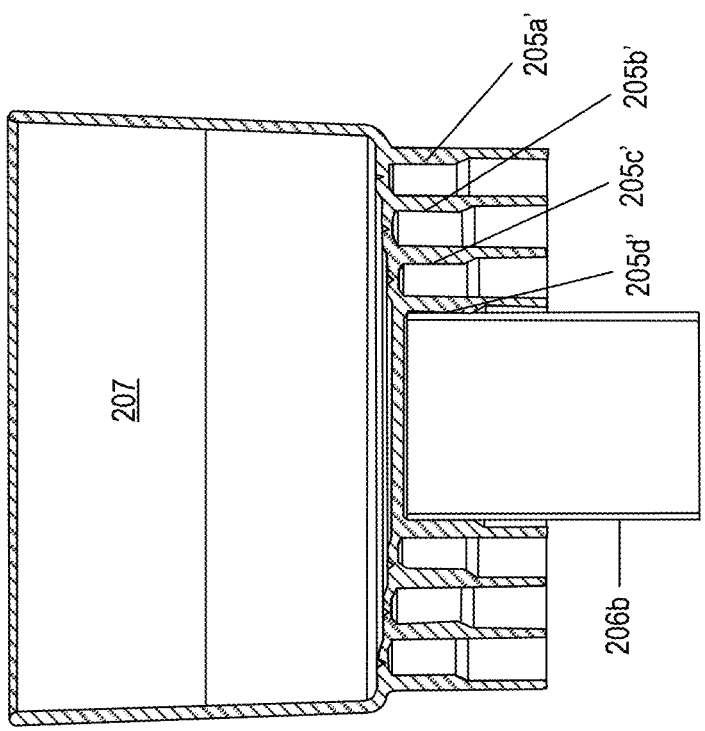
FIG. 6C is another illustration of the exemplary in-line surface drain of FIG. 6A coupled to two different exemplary riser pipes.
Figure 6C:
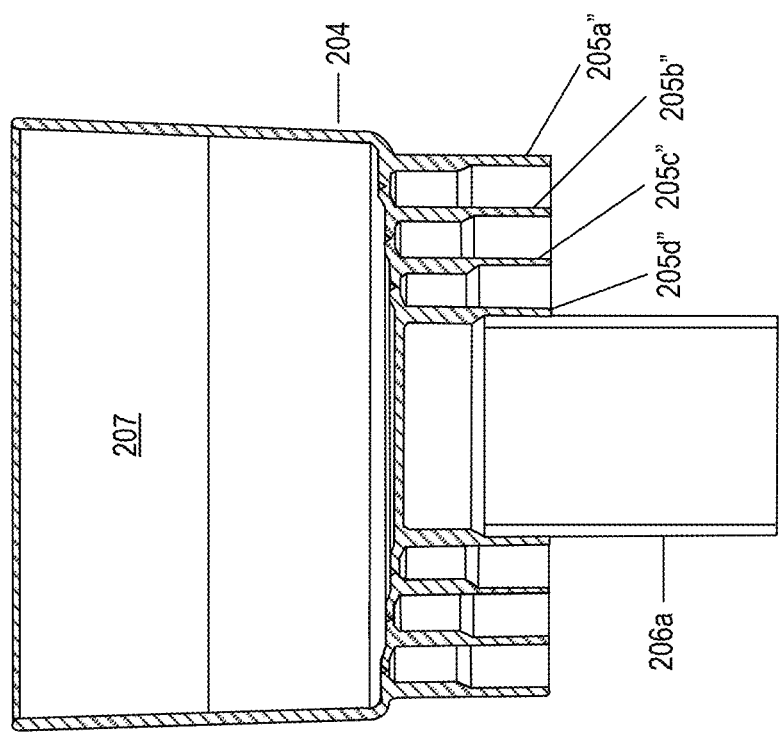

Referring now to FIGS. 6A-6C, another exemplary in-line surface drain 204, consistent with the embodiments of the present disclosure, is provided. As shown in FIGS. 6A and 6B, in-line surface drain 204 may comprise a cylindrical frame 207 and a plurality of concentric rings 205a-d extending or protruding outward from a bottom external surface of cylindrical frame 207. Cylindrical frame 207 may have a diameter in a range between about 4 inches and about 36 inches. For example, cylindrical frame 207 may have a diameter between about 12 inches and 20 inches. In some embodiments, cylindrical frame 207 may have a height in a range between about 3 inches and 10 inches. For example, cylindrical frame 207 may have a height of about 7 inches.

In some embodiments, the plurality of concentric rings 205a-d may comprise different diameters and may be configured to be detachably coupled to riser pipes of different sizes and diameters. For example, concentric ring 205a may have a smaller diameter than concentric ring 205b, concentric ring 205b may have a smaller diameter than concentric ring 205c, and concentric ring 205c may have a smaller diameter than concentric ring 205d. The plurality of concentric rings 205a-d may have diameters in a range between about 4 inches to about 36 inches. For example, concentric rings 205a-d may have diameters of about 4 inches, 6 inches, 8 inches, 10 inches, 12 inches, 14 inches, 15 inches, 16 inches, 18 inches, 21 inches, 24 inches, or 36 inches. In some embodiments, in-line surface drain 204 may be coupled to a riser pipe 206a and/or riser pipe 206b. Riser pipe 206a and/or riser pipe 206b may have a diameter in a range between about 4 inches to about 36 inches. For example, riser pipe 206a and/or riser pipe 206b may have diameters of about 4 inches, 6 inches, 8 inches, 10 inches, 12 inches, 14 inches, 15 inches, 16 inches, 18 inches, 20 inches, 21 inches, 24 inches, or 36 inches. In some embodiments, riser pipe 206a and/or riser pipe 206b may comprise, for example, a smooth polyvinyl chloride (PVC) pipe. In other embodiments, riser pipe 206a and/or riser pipe 206b may comprise a corrugated high-density polyethylene (HDPE) pipe. In yet another embodiment, rise pipe 206a and/or riser pipe 206b may be manufactured using, for example, corrugated polypropylene, fiberglass, or thermoplastic polymer.

As illustrated in FIGS. 6A-6C, the plurality of concentric rings 205a-d may comprise stepped internal surfaces. For example, each of the plurality of concentric rings 205a-d may comprise a stepped internal surface. Alternatively, not all of the plurality of concentric rings 205a-d may comprise a stepped internal surface. Rather, one, two, or three of the concentric rings 205a-d may comprise a stepped internal surface, and the remaining concentric rings may comprise a smooth internal surface, such as the internal surface of the plurality of concentric rings 105a-d in FIG. 5. The stepped internal surface of the plurality of concentric rings 205a-d may allow the plurality of concentric rings 205a-d to accommodate riser pipes of different diameters. For example, as shown in FIG. 6B, concentric ring 205a may comprise a first internal diameter 205a' and a second internal diameter 205a" greater than the first internal diameter 205a'. Additionally, or alternatively, concentric ring 205b may comprise a first internal diameter 205b' and a second internal diameter 205b" greater than the first internal diameter 205b', concentric ring 205c may comprise a first internal diameter 205c' and a second internal diameter 205c" greater than the first internal diameter 205c', and concentric ring 205d may comprise a first internal diameter 205d' and a second internal diameter 205d" greater than the first internal diameter 205d'. In other embodiments, the first internal diameter 205d' of concentric ring 205d may be greater than the second internal diameter 205d", the first internal diameter 205c' of concentric ring 205c may be greater than the second internal diameter 205c", and so on.

Accordingly, one or more of the plurality of concentric rings 205a-d may be configured to accommodate riser pipes of different diameters. For example, as illustrated in FIG. 6C, concentric ring 205d may be configured to accommodate a first riser pipe 206a with an external diameter corresponding to the second internal diameter 205d" and/or a second riser pipe 206b with an external diameter corresponding to the first internal diameter 205d'. Accordingly, concentric ring 205d may be configured to accommodate a first riser pipe 206a with a first, larger external diameter and a second riser pipe 206b with a second, smaller external diameter. In some embodiments, the stepped internal surface of the plurality of concentric rings 205a-d may allow one or more concentric rings to accommodate a plurality of types of riser pipes that have the same nominal dimensions but have different external diameters (e.g., a riser pipe with an external diameter of 6.275" and a riser pipe with an external diameter of 6.625").

Figure 7:
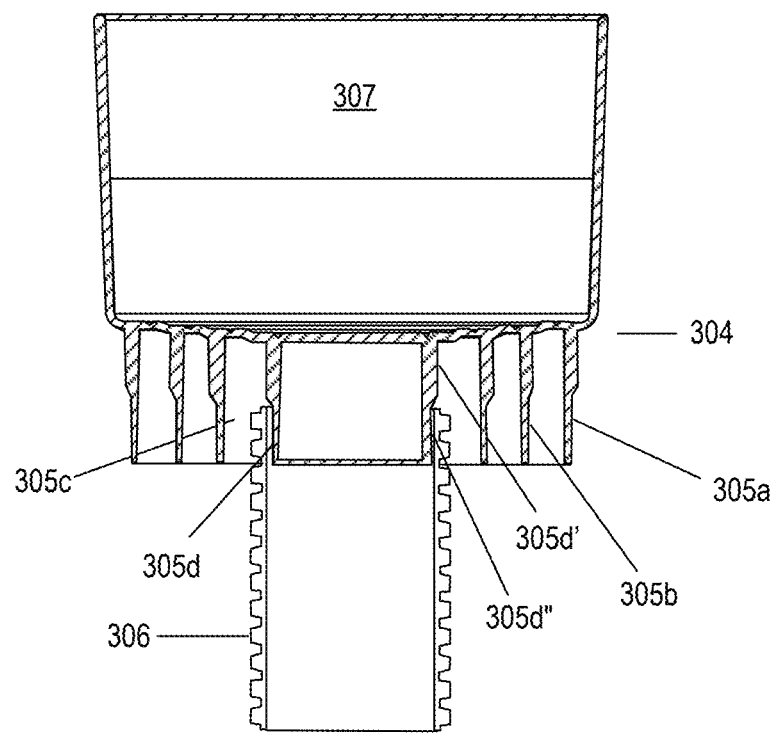
FIG. 7 is an illustration of another exemplary in-line surface drain, consistent with the embodiments of the present disclosure.

Referring now to FIG. 7, another exemplary in-line surface drain 304, in accordance with the embodiments of the present disclosure, is provided. In-line surface drain 304 may comprise a cylindrical frame 307 and a plurality of concentric rings 305a-d extending or protruding outward from a bottom external surface of cylindrical frame 307. Cylindrical frame 307 may have a diameter in a range between about 4 inches and about 36 inches. For example, cylindrical frame 307 may have a diameter between about 12 inches and 20 inches. In some embodiments, cylindrical frame 307 may have a height in a range between about 3 inches and 10 inches. For example, cylindrical frame 307 may have a height of about 7 inches.

In some embodiments, the plurality of concentric rings 305a-d may comprise different diameters and may be configured to be detachably coupled to riser pipes of different sizes and diameters. For example, concentric ring 305a may have a smaller diameter than concentric ring 305b, concentric ring 305b may have a smaller diameter than concentric ring 305c, and concentric ring 305c may have a smaller diameter than concentric ring 305d. The plurality of concentric rings 305a-d may have diameters in a range between about 4 inches to about 36 inches. For example, concentric rings 305a-d may have diameters of about 4 inches, 6 inches, 8 inches, 10 inches, 12 inches, 14 inches, 15 inches, 16 inches, 18 inches, 21 inches, or 24 inches, or 36 inches. In some embodiments, in-line surface drain 304 may be coupled to a riser pipe 306. Riser pipe 306 may have a diameter in a range between about 4 inches to about 36 inches. For example, riser pipe 306 may have a diameter of about 4 inches, 6 inches, 8 inches, 10 inches, 12 inches, 14 inches, 15 inches, 16 inches, 18 inches, 20 inches, 21 inches, 24 inches, or 36 inches. In some embodiments, riser pipe 306 may comprise, for example, a corrugated high-density polyethylene (HDPE) pipe. In other embodiments, riser pipe 306 may comprise a smooth polyvinyl chloride (PVC) pipe. In yet another embodiment, rise pipe 306 may be manufactured using, for example, corrugated polypropylene, fiberglass, or thermoplastic polymer.

As illustrated in FIG. 7, the plurality of concentric rings 305a-d may comprise stepped external surfaces. For example, each of the plurality of concentric rings 305a-d may comprise a stepped external surface. Alternatively, not all of the plurality of concentric rings 305a-d may comprise a stepped external surface. Rather, one, two, or three of the concentric rings 305a-d may comprise a stepped external surface, and the remaining concentric rings may comprise a smooth external surface, such as the external surface of the plurality of concentric rings 105a-d in FIG. 5. The stepped external surface of the plurality of concentric rings 305a-d may allow the plurality of concentric rings 305a-d to accommodate riser pipes of different diameters. For example, as shown in 7, concentric ring 305d may comprise a first external diameter 305d' and a second external diameter 305d" smaller than the first external diameter 305d'. In other embodiments, the first external diameter 305d' of concentric ring 305d may be smaller than the second external diameter 305d".

Accordingly, one or more of the plurality of concentric rings 305a-d may be configured to accommodate riser pipes of different diameters. For example, as illustrated in FIG. 7, concentric ring 305d may be configured to accommodate riser pipe 306 with an internal diameter corresponding to the second external diameter 305d" and/or a second riser pipe (not shown) with an internal diameter corresponding to the first external diameter 305d'. In some embodiments, the stepped external surface of the plurality of concentric rings 305a-d may allow one or more concentric rings to accommodate a plurality of types of riser pipes that have the same nominal dimensions but have different internal diameters (e.g., a riser pipe with an internal diameter of 6.275" and a riser pipe with an internal diameter of 6.625"). In some embodiments, one or more of the plurality of concentric rings 305a-d may comprise both stepped internal surface(s) (such as the stepped internal surfaces in FIGS. 6A-6C) and stepped external surface(s). Accordingly, one or more of the plurality of concentric rings 305a-d may be configured to accommodate at least four different types of riser pipes.

Figure 8:
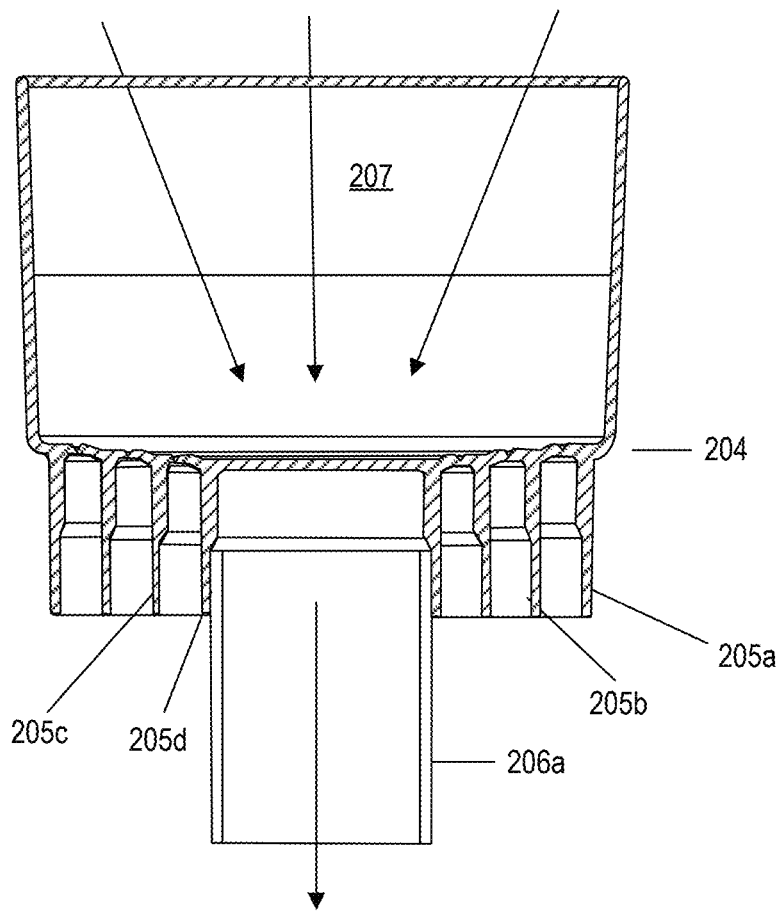
FIG. 8 is an illustration of another exemplary in-line surface drain, consistent with the embodiment of the present disclosure.
Figure 9:
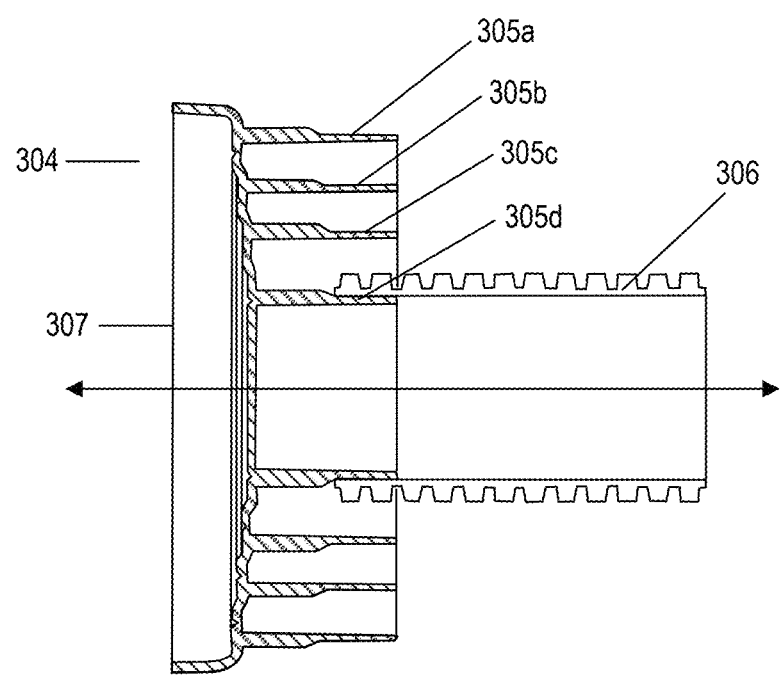
FIG. 9 is an illustration of another exemplary in-line surface drain, consistent with the embodiment of the present disclosure.

FIG. 8 is another illustration of the exemplary in-line surface drain 204 of FIGS. 6A-6C, and FIG. 9 is another illustration of the exemplary in-line surface drain 304 of FIG. 7. As discussed above, while in-line surface drains may be coupled to a riser pipe vertically such that the riser pipe can be terminated at a surface, the in-line surface drain may also be oriented horizontally so as to connect horizontally to other pipes and/or structures. For example, as illustrated in FIG. 8, in-line surface drain 204 may comprise a plurality of concentric rings 205a-d, and concentric ring 205d may be configured to accommodate and be detachably coupled to riser pipe 206a. Accordingly, in-line surface drain 204 may be detachably coupled to a riser pipe 206a vertically, and fluid (such as water) may flow vertically in the direction of the arrows through cylindrical frame 207, through concentric ring 205d, and through riser pipe 206a. Additionally, or alternatively, as shown in FIG. 9, in-line surface drain 304 may be configured to accommodate and be detachably coupled to riser pipe 306 horizontally. Accordingly, in-line surface drain 304 may be detachably coupled to riser pipe 306 horizontally, and fluid (such as water) may flow horizontally in the direction of the arrows. As indicated by the arrows in FIG. 9, in some embodiments, fluid may flow bidirectionally and horizontally through cylindrical frame 307, through concentric ring 305d, and through riser pipe 306. In some embodiments, cylindrical frame 307 may be configured to be coupled to other pipes or other structures.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. An in-line surface drain, comprising:
a cylindrical frame including a bottom surface, wherein the bottom surface comprises a plurality of steps; and
a plurality of concentric rings configured to protrude outwardly from the bottom surface of the cylindrical frame;
wherein a distance between each of the plurality of concentric rings corresponds to a width of each of the plurality of steps;
wherein a height of each of the plurality of concentric rings is different;
wherein the height of each of the plurality of concentric rings increases from a perimeter of the cylindrical frame to a center of the cylindrical frame; and
wherein each of the plurality of concentric rings comprises at least one slot formed through each of the plurality of concentric rings configured to secure a riser pipe to the in-line surface drain.

2. The in-line surface drain of claim 1, wherein the plurality of steps extends downwardly from a perimeter of the cylindrical frame to a center of the cylindrical frame.

3. The in-line surface drain of claim 1, further comprising a lip section formed on an external surface of the cylindrical frame.

4. The in-line surface drain of claim 3, wherein the lip section comprises at least one anchor point and at least one flange.

5. The in-line surface drain of claim 4, wherein the anchor point comprises a hole formed in the lip section.

6. The in-line surface drain of claim 3, wherein the lip section comprises a plurality of flanges spaced equidistantly around the cylindrical frame.

7. The in-line surface drain of claim 1, wherein at least one of the plurality of concentric rings is configured to detachably accommodate the riser pipe.

8. The in-line surface drain of claim 1, wherein the at least one slot comprises a width of approximately one inch.

9. The in-line surface drain of claim 1, wherein the at least one slot is tapered at an angle.

10. The in-line surface drain of claim 9, wherein a width of a top of the at least one slot is less than a width of a bottom of the at least one slot.

11. The in-line surface drain of claim 1, wherein a length of the at least one slot is approximately 3.5 inches.

12. The in-line surface drain of claim 1, wherein the plurality of concentric rings are cut from the cylindrical frame.

13. An in-line surface drain, comprising:
a cylindrical frame including a slanted bottom surface; and
a plurality of concentric rings configured to protrude outwardly from the bottom surface of the cylindrical frame;
wherein a height of each of the plurality of concentric rings is different;
wherein the height of each of the plurality of concentric rings increases from a perimeter of the cylindrical frame to a center of the cylindrical frame; and
wherein each of the plurality of concentric rings comprises at least one slot formed through each of the plurality of concentric rings configured to secure a riser pipe to the in-line surface drain.

14. The in-line surface drain of claim 13, wherein the bottom surface slants downwardly from a perimeter of the cylindrical frame to a center of the cylindrical frame.

15. The in-line surface drain of claim 13, wherein the at least one slot is tapered at an angle.

16. The in-line surface drain of claim 13, wherein a width of a top of the at least one slot is less than a width of a bottom of the at least one slot.

17. The in-line surface drain of claim 13, further comprising a lip section formed on an external surface of the cylindrical frame.

18. The in-line surface drain of claim 13, wherein the lip section comprises at least one anchor point and at least one flange.

* * * * *